Aug. 4, 1953
C. W. LEGUILLON
2,647,280
MANUFACTURE OF V BELTS
Filed Nov. 7, 1950
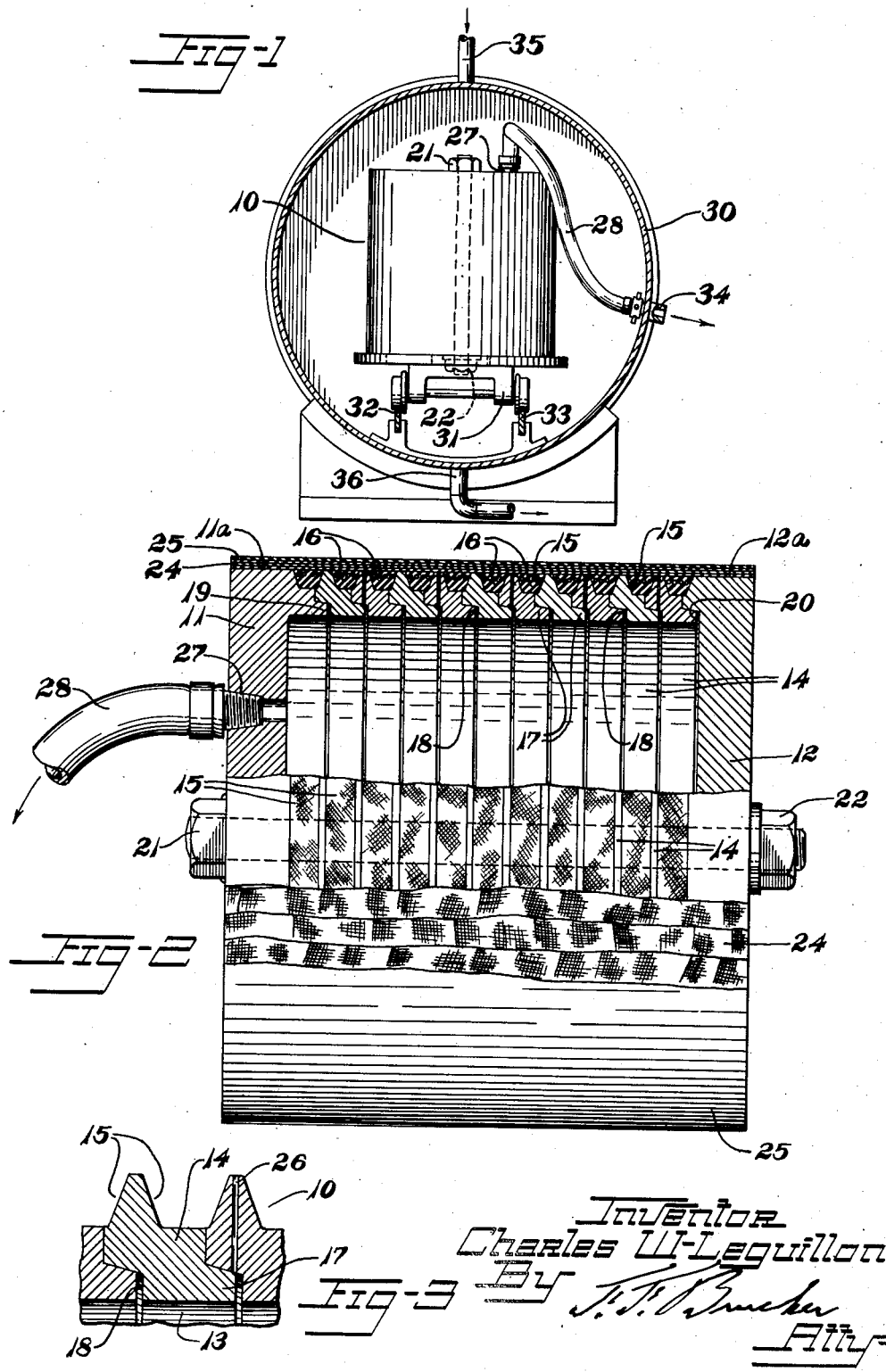
Inventor
Charles W. Leguillon
By
Att'y Patented Aug. 4, 1953

2,647,280

UNITED STATES PATENT OFFICE 2,647,280

MANUFACTURE OF V BELTS

Charles W. Leguillon, Akron, Ohio, assignor to The B. F. Goodrich Company, New York, N. Y., a corporation of New York Application November 7, 1950, Serial No. 194,444

2 Claims. (Cl. 18—6)

This invention relates to the manufacture of endless V-belts and is especially useful in molding and vulcanizing such belts.

In the manufacture of endless V-belts of small circumference it has been the practice to assemble a tension layer of cords, wires or fabric and a compression portion of unvulcanized rubber within a surrounding cover of bias laid fabric or other wear resisting material to provide an unvulcanized belt body roughly approximating the shape of the desired article. Such belt bodies have then been vulcanized usually by placing them in outwardly open grooves of curing drums and sometimes within molding cavities provided between divided members of a metal mold. Full molding of belts between metal mold plates has been found sometimes to provide non-uniform and unsatisfactory results as the tendency for the unvulcanized belt body to roll laterally in the closing of the mold caused displacement of the materials, resulting in defective belts.

Generally such belts have been placed in open grooves between annular mold rings stacked to provide a grooved drum, and wrappings of rags or fabric webbing have been applied about the drum under tension to bind the belts in the grooves and to apply pressure thereto. With such apparatus belts sometimes have failed to fill the mold grooves properly because of air trapped in the grooves or lack of proper pressure upon the belts. Also the pervious rag wrapping has permitted steam to contact the belts and cause blisters by penetrating the fabric cover of the belt.

Prior attempts to avoid the foregoing difficulties have required complicated and expensive special apparatus.

It is an object of the present invention to avoid the foregoing and other difficulties by the use of a general purpose rubber-vulcanizing autoclave and ordinary belt-molding ring molds, thereby avoiding the use of expensive special equipment.

Other objects are to provide for removing entrapped air, for providing superior pressure against the belts at the open side of the mold grooves, to prevent contact of steam with the belts, and to provide uniformly matched sets of belts vulcanized under identical conditions.

These and other objects will appear from the following description and the accompanying drawings.

Of the drawings,

Fig. 1 is a cross-sectional view of a general purpose rubber-vulcanizing autoclave with vulcanizing apparatus therein constructed in accordance with and embodying the invention hereof.

Fig. 2 is a side view of the vulcanizing mold apparatus, partly broken away and partly in sections.

Fig. 3 is an enlarged detail sectional view of the molding rings.

Referring to the drawing, the numeral 10 designates a curing drum constructed of a pair of end plates 11, 12 having a plurality of matching curing ring sections 14 mounted therebetween defining a closed chamber 13. The ring sections 14 are of the usual mold ring type adapted to be assembled side by side in overlapping nested relation and providing molding grooves 15 therebetween for receiving endless V-belts 16. For this purpose each ring 14 has an annular flange 17 at one face thereof and an annular rabbet 18 at the other face for engaging over the flange 17 of the adjacent ring. The end plate 11 has a corresponding dowel flange 19 and the opposite end plate 12 has a rabbet 20 for engaging the rings of the stack. The rings and the end plates together form a closed drum and are held together by a bolt 21 and nut 22 extending axially therethrough. The end plates extend beyond the grooves to provide circumferential sealing faces 11a, 12a.

The belts 16 are assembled in the grooves 15 between the rings and the bolt and nut screwed in place. A wrapping 24 of rags or webbing is wound helically about the belts to hold them in place. Over this wrapping a sealing cover 25 of rubber or other impervious rubber-like pliable material, preferably in the form of an endless band, is applied to seal the belts from contact with steam and extends over the sealing faces 11a, 12a.

For venting air from the belt-molding grooves, and from between the cover and the drum, vent holes 26 may be provided in the rings 14 extending therethrough to supplement the joints between the rings which also provide escape of air. A pipe connection 27 is provided on one of the end plates 11 and may be connected to a flexible conduit 28.

With the drum 10 loaded with unvulcanized belts and the wrapping 24 and cover 25 in place, the drum may be placed in the usual general purpose autoclave 30, as by mounting it on a carriage 31 running on tracks 32, 33. The conduit is connected to the atmosphere as by means of a connection 34 extending through the wall of the autoclave. Steam is admitted to the autoclave 30 under pressure as by means of a pipe connection 35 and condensate may escape through a drain line 36.

With the belts mounted upon the drum 10 and the wrapping and cover in place, the drum is placed in the autoclave and the connection 28 is made to the atmosphere. The autoclave is closed and steam admitted under pressure. The steam pressure presses the cover against the belts forcing the belts to conform to the grooves while entrapped air is vented from the drum to the atmosphere resulting in the belts being compacted by differential pressure. The heat of the steam vulcanizes the belts.

After vulcanization of the belts, the steam is turned off, the exhaust to the drain is opened, and the pressure in the autoclave reduced to room pressure. The autoclave is then opened and the drum removed therefrom, the conduit 28 being disconnected for this purpose. The cover 25 and wrapping 24 are then removed. The bolt 21 is next removed and the rings 14 and plates 11, 12 are separated to permit removal of the belts.

The cover 25 prevents contact of steam with the belts and its margins are sealed against the surface of the end plates of the drum by the steam pressure. The fabric wrapping between the impervious cover and the drum prevents adhesion of the cover to the drum, especially when the cover and drum are heated.

The invention makes use of the usual mold rings and the usual general purpose autoclave so that a minimum amount of special equipment is required.

The invention is especially useful in vulcanizing and forming sets of identical belts under identical vulcanizing conditions for use in multiple belt drives.

Variations may be made without departing from the scope of the invention as it is defined by the following claims:

I claim:

1. A mold assembly for vulcanizing V-belts in the presence of a heated pressure fluid in an autoclave, the assembly comprising a plurality of matching ring sections fitting each other in coaxial alignment and having annular V-belt shaping grooves between adjacent rings at the outer periphery of the rings, closing means at opposite ends of the stacked rings to provide a chamber within the mold assembly, said rings having air-venting communication from said grooves and from portions of the peripheral surface of the rings intermediate the grooves to said chamber, a tensioned wrapping of cloth material around the ring sections and spanning said grooves to apply constricting pressure to belts disposed in said grooves, a cover of rubber-like material stretched over said wrapping and impervious to the heated vulcanizing fluid to further constrict the belts into the grooves and to seal the belts from penetration of the heated fluid during vulcanization, the closing means sealing the ends of the chamber from the vulcanizing fluid, and a conduit from said chamber to the exterior of the autoclave to vent said chamber to the atmosphere during vulcanization.

2. A method of vulcanizing V-belts in the presence of a heated pressure fluid in an autoclave, which method comprises disposing unvulcanized belts in annular molding grooves on a cylindrical mold formed with matching ring sections fitting each other in coaxial alignment, wrapping cloth material under tension around said cylindrical surface of the mold and over said belts to cover said surface and to apply constricting pressure against the V-belts to urge them into their respective grooves, stretching an impervious rubber sleeve around the wrapping from one end of the mold to the other end to seal the wrapping and the belts from the pressure fluid, closing the opposite ends of the mold to provide a chamber inside the mold sealed from the pressure fluid, venting the V-belt grooves and portions of the peripheral surface of the rings intermediate the grooves into said chamber, subjecting the cylindrical surface covered by the rubber sleeve to a heated pressure fluid to effect vulcanization of the belts, and venting said chamber within the mold to the atmospheric pressure throughout the vulcanization.

CHARLES W. LEGUILLON.

References Cited in the file of this patent

UNITED STATES PATENTS

| Number | Name | Date |
|---|---|---|
| 2,115,543 | Thackray | Apr. 26, 1938 |
| 2,253,792 | Leavenworth | Aug. 26, 1941 |
| 2,276,004 | Vidal et al. | Mar. 10, 1942 |
| 2,301,125 | Kramp et al. | Nov. 3, 1942 |
| 2,392,707 | Taylor | Jan. 8, 1946 |
| 2,550,183 | Bourne | Apr. 24, 1951 |
| 2,583,085 | Campbell | Jan. 22, 1952 |